UNITED STATES PATENT OFFICE.

BERNHARD HÖVERMANN, OF SALZWEDEL, GERMANY.

ARTIFICIAL-STONE COMPOSITION.

932,706.     Specification of Letters Patent.     Patented Aug. 31, 1909.

No Drawing.     Application filed August 27, 1908. Serial No. 450,536.

*To all whom it may concern:*

Be it known that I, BERNHARD HÖVERMANN, works director of the gas and water works, a citizen of the town of Salzwedel, in Germany, and whose post-office is Gas and Water Works, in Salzwedel, have invented certain new and useful Improvements in Artificial-Stone Composition; and I do hereby declare the following to be a full, clear, and exact description of the invention, such as will enable others skilled in the art to which it appertains to make and use the same.

The invention relates to the hardening of cement, and its object is to provide a new mixture of cement and other masses, in order to make the cement-mass suitable for hardening very rapidly.

Attempts have hitherto been made to increase the hardening or binding capacity of mixtures of cement and alkali-carbonate by the addition of chlorid of sodium, in order to make the cement-mass suitable for calking the crevices through which water flowed freely or under pressure. If these mixtures show a rapid capacity for binding or hardening, they also present the disadvantage that they cannot be brought directly in the pulverized condition into the market for sale on account of the water-attracting property of the chlorid of sodium. These mixtures were therefore produced in this way that, shortly before they were used, the dried mixture of cement and sand was mixed with a watery solution of potash and chlorid of sodium. Large quantities of such a mass could not be produced at one time as the workmen engaged in using same could not use it up quickly enough in order to prevent it becoming hard, before it was applied to the part to be calked or rendered impervious against water.

The novel feature of the present invention consists in the fact that a pulverized medium is offered for use which is capable of being sent to any distance and can be employed without any further trouble in this pulverized condition for the purpose of calking for example, with the assistance of under ground water, without using water previously and forming by this means a plastic or pulpy mass. The underground water which flows or rushes out itself serves as the hardening medium. By this means the workman can make use of the powder given to him, which is quite ready for use without any further trouble, and there is another advantage presented over these hardening mediums already in use and that is that the powder in question can be used according as it is required. There is therefore no necessity to hurry over the work or to employ periodically small amounts of a dough-like mass.

The essential feature of the invention consists therein that sulfate of aluminium and white lead are added to the already known mixture of cement and alkali carbonate (preferably carbonate of soda) and the mixture well stirred up so that a bluish-white powder is obtained. According to the proportions of the mixture, powders can be obtained which set or harden very quickly or not so quickly. The good effect and the capability of using the powder is still more increased, if, to the above mixture, magnesia and borax are added.

The new product has shown itself pre-eminently suitable for keeping out the dampness or moisture, for example, produced by underground water in cellars, shafts, etc. In order to prevent the penetration of the water the powder is applied or used at the spot where the water breaks through until the leak or inrush ceases. The complete setting or hardening of the mass is effected in a few minutes; the result is a stony layer or bed. This mass has also shown itself excellently suitable for damp walls, partitions, etc. In these cases, only so much of the mass need be used as can be applied very quickly, as this mass becomes rigid or sets immediately. The mass is perfectly impervious to water and can be coated or painted with water-colors and oil-colors or covered with tapestry or wall paper. The color of the hardening mass is very brilliant. To sum up, it can be used in every case where solidity or calking comes into question, for example, in the cleaning, polishing and plastering of façades or fronts of buildings. The quickly hardening mass is particularly suitable for water works, *i. e.* building on or in water and for foundation.

Having now particularly described and ascertained the nature of my said invention and in what manner the same is to be performed I declare that what I claim is—

1. The herein-described composition of matter consisting of cement, an alkaline carbonate, sulfate of aluminium, white lead, magnesia and borax.

2. The herein-described composition of matter, consisting of cement, carbonate of soda, sulfate of aluminium, white lead, magnesia and borax.

3. The herein-described composition of matter, consisting of cement, carbonate of a metal of the alkalines, sulfate of aluminium, white lead, magnesia and borax.

In testimony that I claim the foregoing as my invention, I have signed my name in presence of two subscribing witnesses.

BERNHARD HÖVERMANN.

Witnesses:
HEINRICH KÖNIG,
FRIEDRICH KRAUSE.